(12) United States Patent
Kim et al.

(10) Patent No.: US 11,026,140 B2
(45) Date of Patent: Jun. 1, 2021

(54) METHOD FOR MANAGING TERMINAL CONTEXT AND DEVICE FOR SUPPORTING SAME

(71) Applicant: LG ELECTRONICS INC., Seoul (KR)

(72) Inventors: Seokjung Kim, Seoul (KR); Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/481,818

(22) PCT Filed: Jan. 26, 2018

(86) PCT No.: PCT/KR2018/001146
§ 371 (c)(1),
(2) Date: Jul. 29, 2019

(87) PCT Pub. No.: WO2018/139888
PCT Pub. Date: Aug. 2, 2018

(65) Prior Publication Data
US 2020/0022044 A1  Jan. 16, 2020

Related U.S. Application Data

(60) Provisional application No. 62/451,725, filed on Jan. 29, 2017.

(51) Int. Cl.
*H04W 36/02* (2009.01)
*H04W 76/27* (2018.01)
(Continued)

(52) U.S. Cl.
CPC ........... *H04W 36/02* (2013.01); *H04W 36/08* (2013.01); *H04W 36/14* (2013.01); *H04W 36/30* (2013.01);
(Continued)

(58) Field of Classification Search
CPC ..... H04W 36/02; H04W 76/27; H04W 36/08; H04W 36/14; H04W 36/30;
(Continued)

(56) References Cited

U.S. PATENT DOCUMENTS

2008/0019306 A1* 1/2008 Damnjanovic ..... H04W 74/002
370/329
2012/0039305 A1* 2/2012 Han ..................... H04W 36/245
370/332

(Continued)

FOREIGN PATENT DOCUMENTS

WO  2014148746  9/2014

OTHER PUBLICATIONS

Qualcomm Incorporated, "UE mobility while in RRC inactive mode—SA2 aspects", S2-170228, SA WG2 Meeting#118BIS (Year: 2017).*

(Continued)

*Primary Examiner* — Andrew Lai
*Assistant Examiner* — Mohammed M Murshid
(74) *Attorney, Agent, or Firm* — Lee Hong Degerman Kang Waimey

(57) ABSTRACT

A method for managing a terminal context and a device for supporting the same are presented. The method comprises the steps of: receiving, from a first base station, a data forwarding indicator for indicating uplink data to be forwarded when the uplink data is generated; receiving uplink (Continued)

data from a terminal in an RRC inactive state; and forwarding, to the first base station, the uplink data according to the data forwarding indicator.

12 Claims, 11 Drawing Sheets

(51) Int. Cl.
*H04W 36/08* (2009.01)
*H04W 36/14* (2009.01)
*H04W 36/30* (2009.01)
*H04W 72/04* (2009.01)
*H04W 72/12* (2009.01)

(52) U.S. Cl.
CPC ..... *H04W 72/042* (2013.01); *H04W 72/1284* (2013.01); *H04W 76/27* (2018.02)

(58) Field of Classification Search
CPC ........... H04W 72/042; H04W 72/1284; H04W 36/0033; H04W 48/20; H04W 76/11; H04W 88/08
See application file for complete search history.

(56) References Cited

U.S. PATENT DOCUMENTS

| | | | |
|---|---|---|---|
| 2012/0314586 A1* | 12/2012 | Yamamoto | H04W 76/20 370/246 |
| 2013/0183971 A1* | 7/2013 | Tamaki | H04W 36/0061 455/436 |
| 2016/0007243 A1* | 1/2016 | Park | H04W 24/10 370/331 |
| 2016/0081115 A1* | 3/2016 | Pang | H04W 56/001 370/329 |
| 2016/0254881 A1* | 9/2016 | Meylan | H04L 1/188 370/216 |
| 2017/0251516 A1* | 8/2017 | Bangolae | H04W 76/27 |
| 2019/0268816 A1* | 8/2019 | Ma | H04W 64/00 |
| 2019/0349970 A1* | 11/2019 | Chen | H04W 72/1289 |
| 2019/0357091 A1* | 11/2019 | Jin | H04L 5/0055 |

OTHER PUBLICATIONS

Ericsson, "On common and specific building blocks for inactive UEs", R3-162416 (Year: 2016).*
PCT International Application No. PCT/KR2018/001146, International Search Report dated May 8, 2018, 4 pages.
Qualcomm, "UE mobility while in RRC inactive mode—SA2 aspects", SA WG2 Meeting #118bis, S2-170228, Jan. 2017, 6 pages.
Ericsson, "On common and specific building blocks for inactive UEs", 3GPP TSG RAN WG3 Meeting #93bis, R3-162416, Oct. 2016, 9 pages.
Qualcomm, "NR RRC Inactive State principles—UE ID", 3GPP TSG RAN WG3 Meeting #94, R3-163029, Nov. 2016, 5 pages.
LG Electronics, "Discussion on inactive mode in NR", 3GPP TSG RAN WG3 Meeting #93bis, R3-162362, Oct. 2016, 4 pages.

* cited by examiner

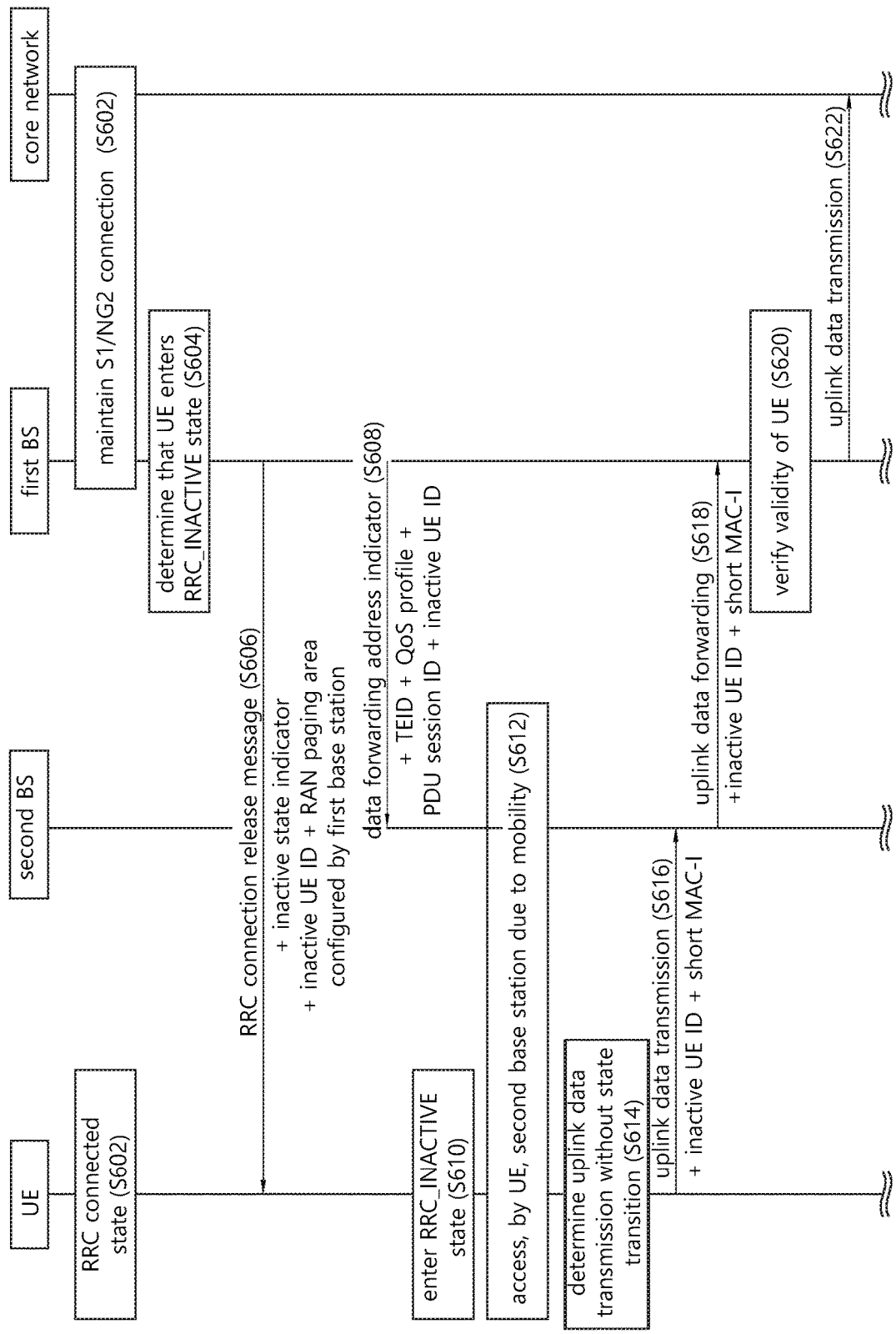

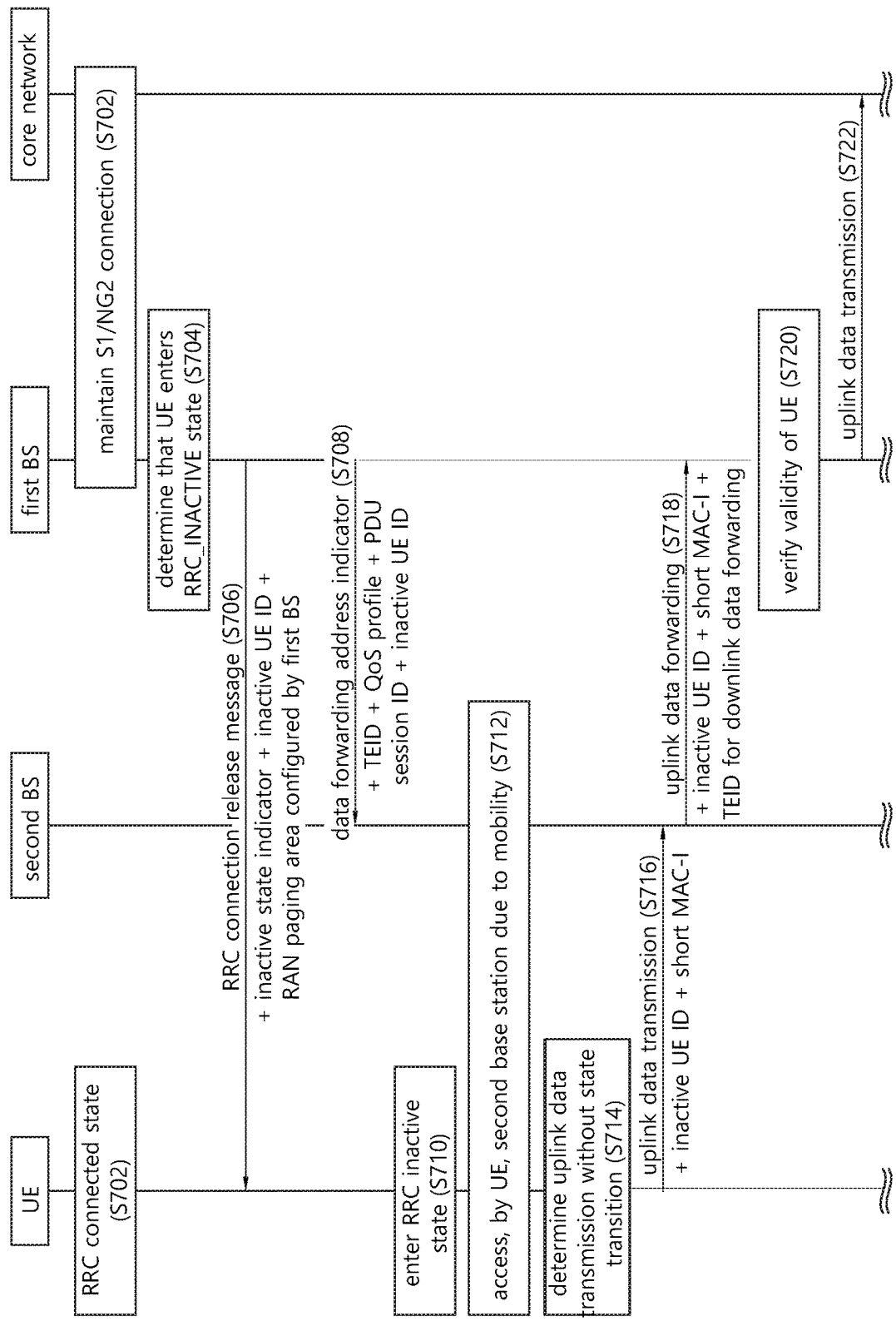

METHOD FOR MANAGING TERMINAL CONTEXT AND DEVICE FOR SUPPORTING SAME

CROSS-REFERENCE TO RELATED APPLICATIONS

This application is the National Stage filing under 35 U.S.C. 371 of International Application No. PCT/KR2018/001146, filed on Jan. 26, 2018, which claims the benefit of U.S. Provisional Application No. 62/451,725, filed on Jan. 29, 2017, the contents of which are hereby incorporated by reference herein in its entirety.

BACKGROUND OF THE INVENTION

Field of the Invention

The present invention relates to a method of managing a UE context when a UE in an RRC_INACTIVE state transmits an uplink message.

Related Art

In order to meet the demand for wireless data traffic since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

Meanwhile, in order to uniformly manage an operation state of a UE, an upper layer standard defines a protocol state and presents detailed functions and procedures of the UE. In discussion of NR standardization, an RRC state is defined as an RRC_CONNECTED state and an RRC_IDLE state, and introduction of an RRC_INACTIVE state is further considered.

Meanwhile, in an RRC_INACTIVE state of NR, a UE may generate minimum signaling and minimize power consumption to save resource cost in an RAN and a core network. To this end, there is ongoing discussion on a method of transmitting data without state transition from the RRC_INACTIVE state to an RRC_CONNECTED state. As part of this discussion, there is growing interest on early data transmission. When data to be transmitted is small in size, the early data transmission refers to an operation of transmitting the data before an RRC connection setup is complete. According to the early data transmission, data transmission is possible even if the UE is not in the RRC_CONNECTED state.

SUMMARY OF THE INVENTION

When a UE enters an RRC_INACTIVE state, a connection between a gNB and an NGC may still be maintained. According to early data transmission, the UE in the RRC_INACTIVE state may transmit uplink data without changing the RRC state to an RRC_CONNECTED state. In this case, it may be necessary to forward the uplink data from a current serving gNB to an anchor gNB without fetching a UE context from the anchor gNB. Therefore, data transmitted in the RRC_INACTIVE state needs to be small in size, and latency of data transmission needs to be minimized in an RAN.

According to an embodiment of the present invention, there is provided a method in which a second gNB manages a UE context in a wireless communication system. The method includes: receiving, from a first gNB, a data forwarding indicator indicating for forwarding of uplink data when the uplink data is generated; receiving uplink data from a UE in an RRC_INACTIVE state; and forwarding the uplink data to the first gNB according to the data forwarding indicator.

The data forwarding indicator may include at least one of a quality-of-service (QoS) profile, a protocol data unit (PDU) session identification (ID), a UE ID of the UE, and a tunnel endpoint identifier (TEID) regarding the first gNB.

The method may further include, upon receiving the uplink data from the UE, identifying, by the second gNB, the first gNB by using the UE ID corresponding to the UE. In the forwarding, the uplink data may be forwarded to the first gNB by using the TEID.

The method may further include: after performing the receiving of the data forwarding indicator, moving the UE from coverage of the first gNB to coverage of the first gNB.

The uplink data may include the UE ID of the UE and a short-MAC-I. The method may further include verifying, by the first gNB, validity of the UE on the basis of the short MAC-I.

The method may further include: transmitting, by the first gNB to a core network, uplink data forwarded from the second gNB; and determining whether the UE needs to enter an RRC_CONNECTED state as the first gNB transmits the uplink data.

The determining of whether the UE needs to enter the RRC_CONNECTED state may include determining, by the first gNB, whether subsequent uplink data greater than or equal to a determined size is transmitted from the UE.

The determining of whether the UE needs to enter the RRC_CONNECTED state may include determining, by the first gNB, whether there is a need to transmit an acknowledgement (ACK) for the uplink data.

The method may further include, upon determining that the UE needs to enter the RRC_CONNECTED state, transmitting, by the first gNB to the second gNB, a handover request message for requesting the UE to handover to the second gNB.

The method may further include, upon receiving the handover request message by the second gNB, requesting, by the second gNB, the first gNB to transmit the UE context of the UE.

The handover request message may include a state transition message for instructing the UE to enter RRC_CONNECTED state.

The handover request message may include an ACK message for uplink data received from the UE, a cell radio network temporary identifier (C-RNTI) of the first gNB, and a downlink forwarding indicator indicating a presence of downlink data to be transmitted to the UE.

The forwarding of the uplink data to the first gNB may include transmitting a TEID for the second gNB to the first gNB.

The method may further include, upon generation of downlink data as the uplink data is transmitted to the core network, forwarding, by the first gNB, the downlink data to the second gNB by using the TEID for the second gNB.

According to another embodiment of the present invention, there is provided a second gNB for managing a UE context in a wireless communication system. The second gNB may include: a memory; a transceiver; and a processor coupling the memory and the transceiver. The processor may be configured to: receive, from a first gNB, a data forwarding indicator indicating for forwarding of uplink data when the uplink data is generated; receive uplink data from a UE in an RRC_INACTIVE state; and forward the uplink data to the first gNB according to the data forwarding indicator.

According to embodiments of the present invention, when a UE in an RRC_INACTIVE state transmits uplink data without changing the RRC state to an RRC_CONNECTED state, a current serving gNB forwards the uplink data to an anchor gNB without fetching a UE context from the anchor gNB, thereby minimizing latency of data transmission in an RAN.

BRIEF DESCRIPTION OF THE DRAWINGS

FIG. 6A and FIG. 6B are flowcharts for explaining a method of managing a UE context according to a first embodiment of the present invention.
FIG. 7A and FIG. 7B are flowcharts for explaining a method of managing a UE context according to a second embodiment of the present invention.

DESCRIPTION OF EXEMPLARY
EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
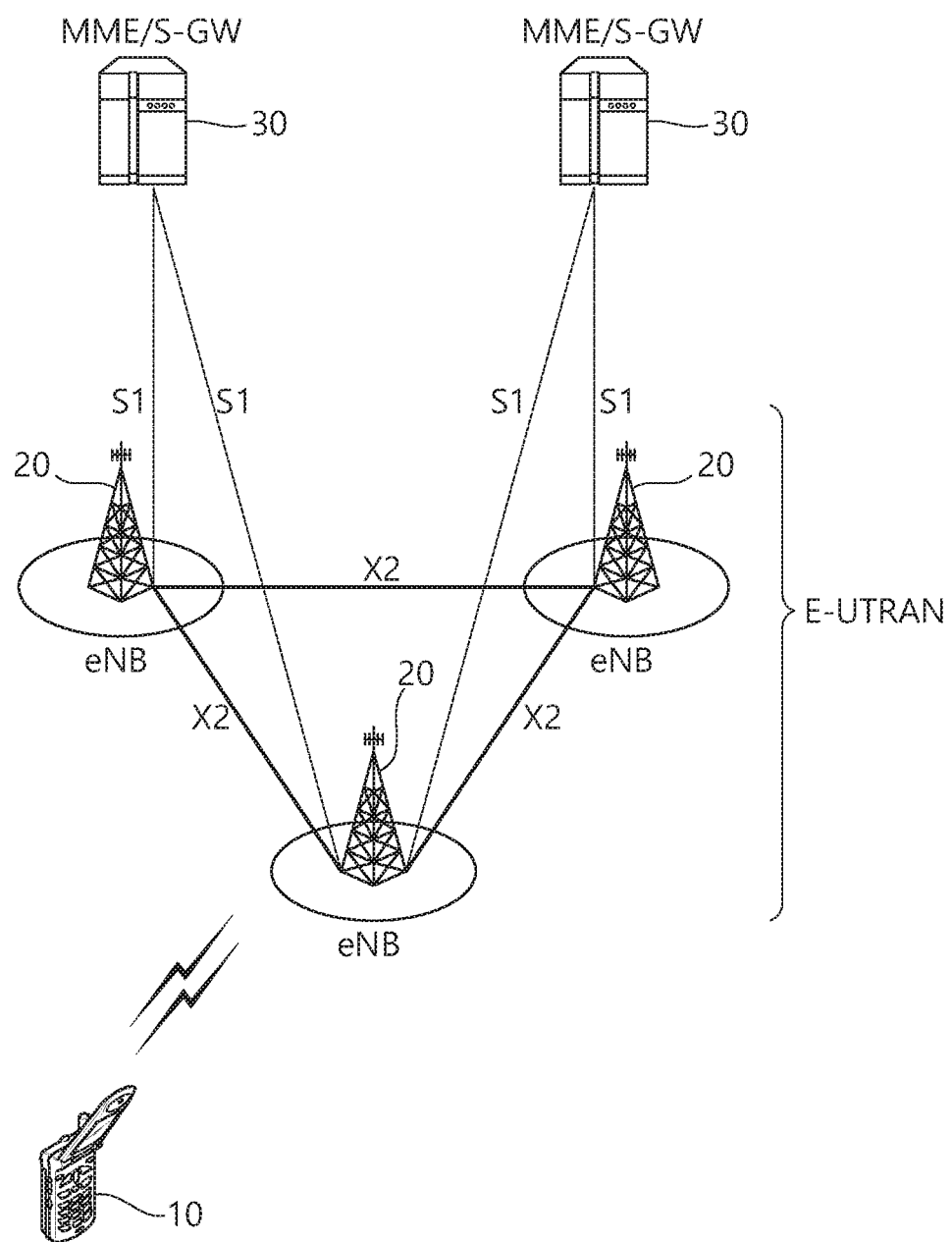
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN may include at least one evolved node-B (eNB) 20, and a plurality of UEs may be present in one cell. An E-UTRAN system is a system evolved from the existing UTRAN system, and may be, for example, a 3GPP LTE/LTE-A system. The E-UTRAN consists of base stations (BSs) (or eNBs) which provide the UE with control plane and user plane protocols, and the BSs are connected through an X2 interface. An X2 user plane (X2-U) interface is defined between the BSs. The X2-U interface provides non-guaranteed delivery of a user plane packet data unit (PDU). An X2 control plane (X2-CP) interface is defined between two neighboring BSs. The X2-CP performs a function of context delivery between BSs, user plane tunnel control between a source BS and a target BS, handover-related message delivery, uplink load management, or the like. The BS is connected to the UE through a radio interface, and is connected to an evolved packet core (EPC) through an S1 interface. An S1 user plane (S1-U) interface is defined between the BS and a serving gateway (S-GW). An S1 control plane (S1-MME) interface is defined between the BS and a mobility management entity (MME). The S1 interface performs an evolved packet system (EPS) bearer service management function, a non-access stratum (NAS) signaling transport function, network sharing, an MME load balancing function, or the like. The S1 interface supports a many-to-many relation between the BS and the MME/S-GW.

The eNB 20 provides the UE with end points of the control plane and the user plane. The eNB 20 is generally a fixed station that communicates with the UE 10 and may be referred to as another terminology, such as a base station (BS), a base transceiver system (BTS), an access point, or the like. One eNB 20 may be arranged in every cell. At least one cell may be present in a coverage of the eNB 20. One cell is configured to have one of bandwidths selected from 1.25, 2.5, 5, 10, and 20 MHz, etc., and provides downlink (DL) or uplink (UL) transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/

S-GW 30 provides an end point of a session and mobility management function for the UE 10. The EPC may further include a packet data network (PDN) gateway (PDN-GW). The PDN-GW is a gateway of which an endpoint is a PDN, and is connected to external network.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
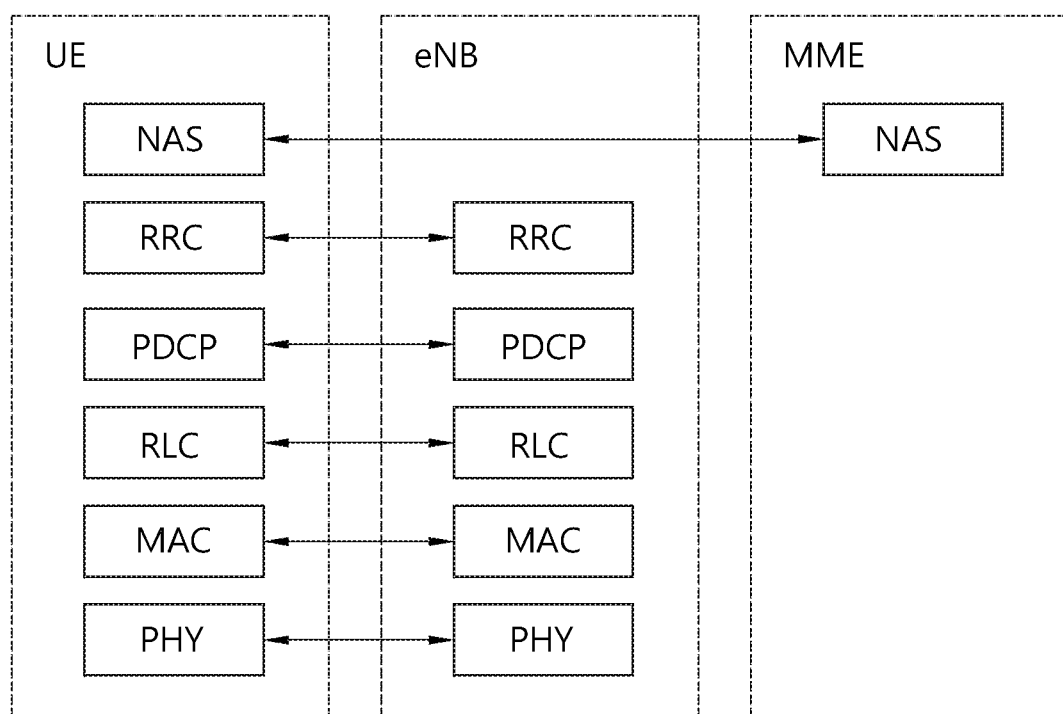
FIG. 2 shows a control plane of a radio interface protocol of an LTE system.
Figure 3:
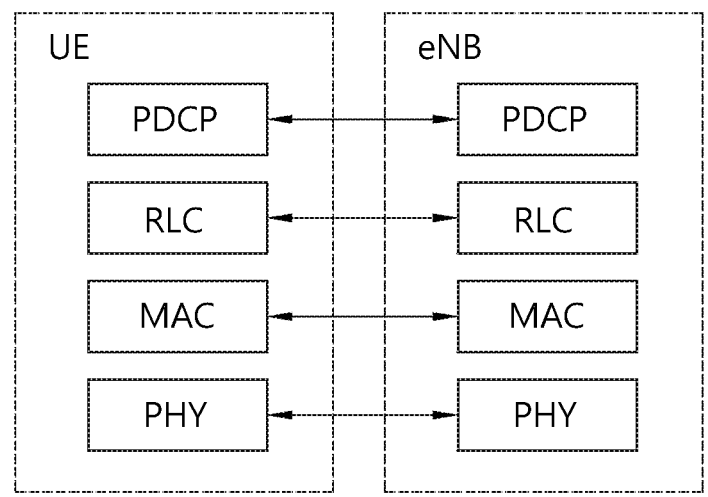
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH)

for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from a higher layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like.

Hereinafter, a 5G network structure is described.

Figure 4:
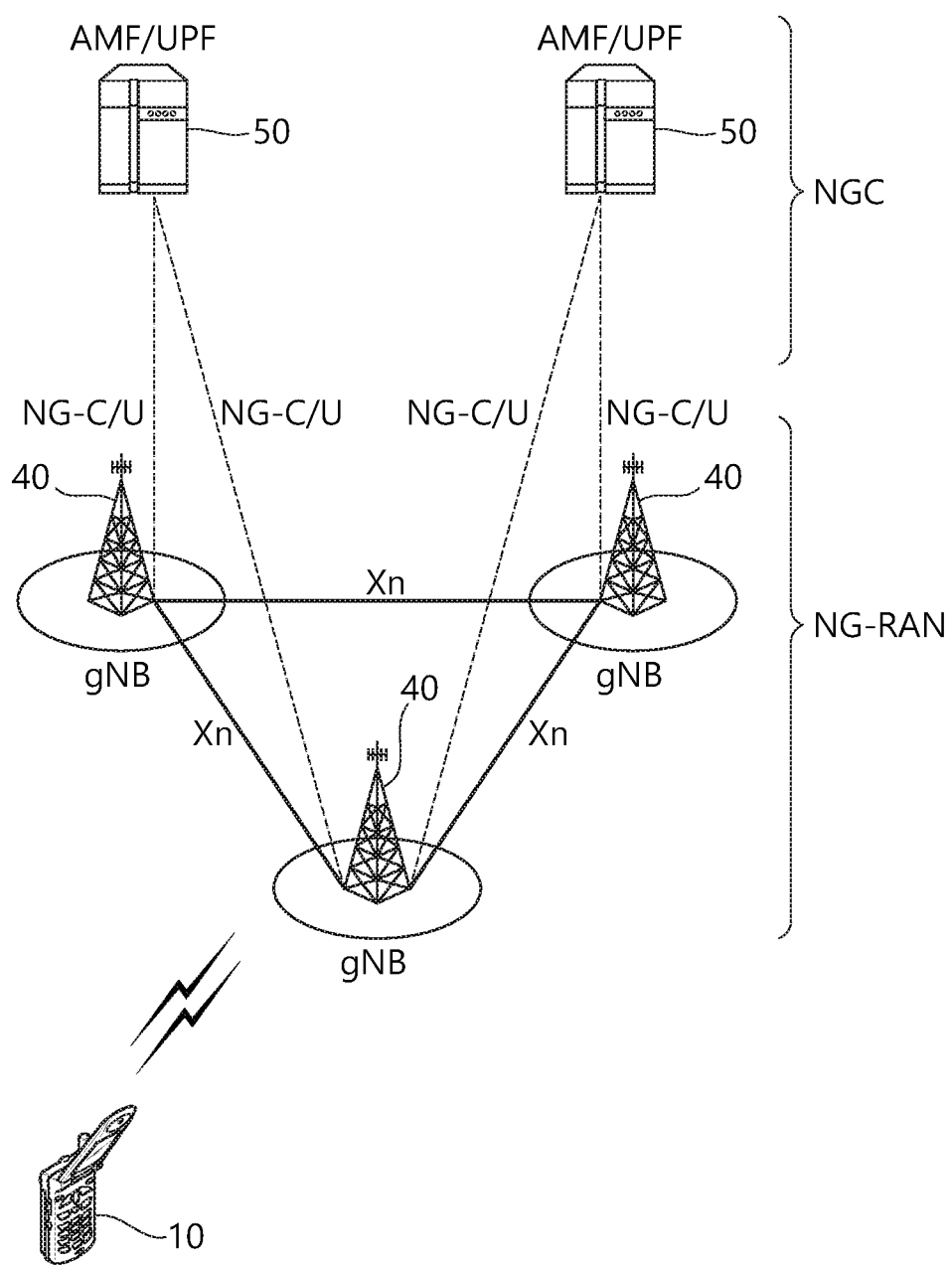
FIG. 4 shows a 5G network structure.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NGC interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

Hereinafter, an RRC_INACTIVE state of a UE is described.

In the discussion on the NR standardization, an RRC_INACTIVE state (RRC inactive state) has been newly introduced in addition to the existing RRC_CONNETED state and RRC_IDLE state. The RRC_INACTIVE state may be a concept similar to a lightly connected mode which is under discussion in LTE. The RRC_INACTIVE state is a state introduced to efficiently manage a specific UE (for example, mMTC UE). A UE in the RRC_INACTIVE state performs a radio control procedure similarly to a UE in the RRC_IDLE state in order to reduce power consumption. However, the UE in the RRC_INACTIVE state maintains a connection state between the UE and a network similarly to the RRC_CONNECTED state in order to minimize a control procedure required when transitioning to the RRC_CONNECTED state. In the RRC_INACTIVE state, a radio access resource is released, but wired access may be maintained. For example, in the RRC_INACTIVE state, the radio access resource is released, but an NG2 interface between a gNB and an NGC or an S1 interface between an eNB and an EPC may be maintained. In the RRC_INACTIVE state, a core network recognizes that the UE is normally connected to a BS.

In case of a UE in the lightly connected mode, an MME may maintain an S1 connection of the activated UE to hide mobility and state transitions from a core network. In other words, in case of a UE in the RRC_INACTIVE state, an AMF may maintain an NG connection of the activated UE to hide mobility and state transitions from a next generation core (NGC).

Figure 5:
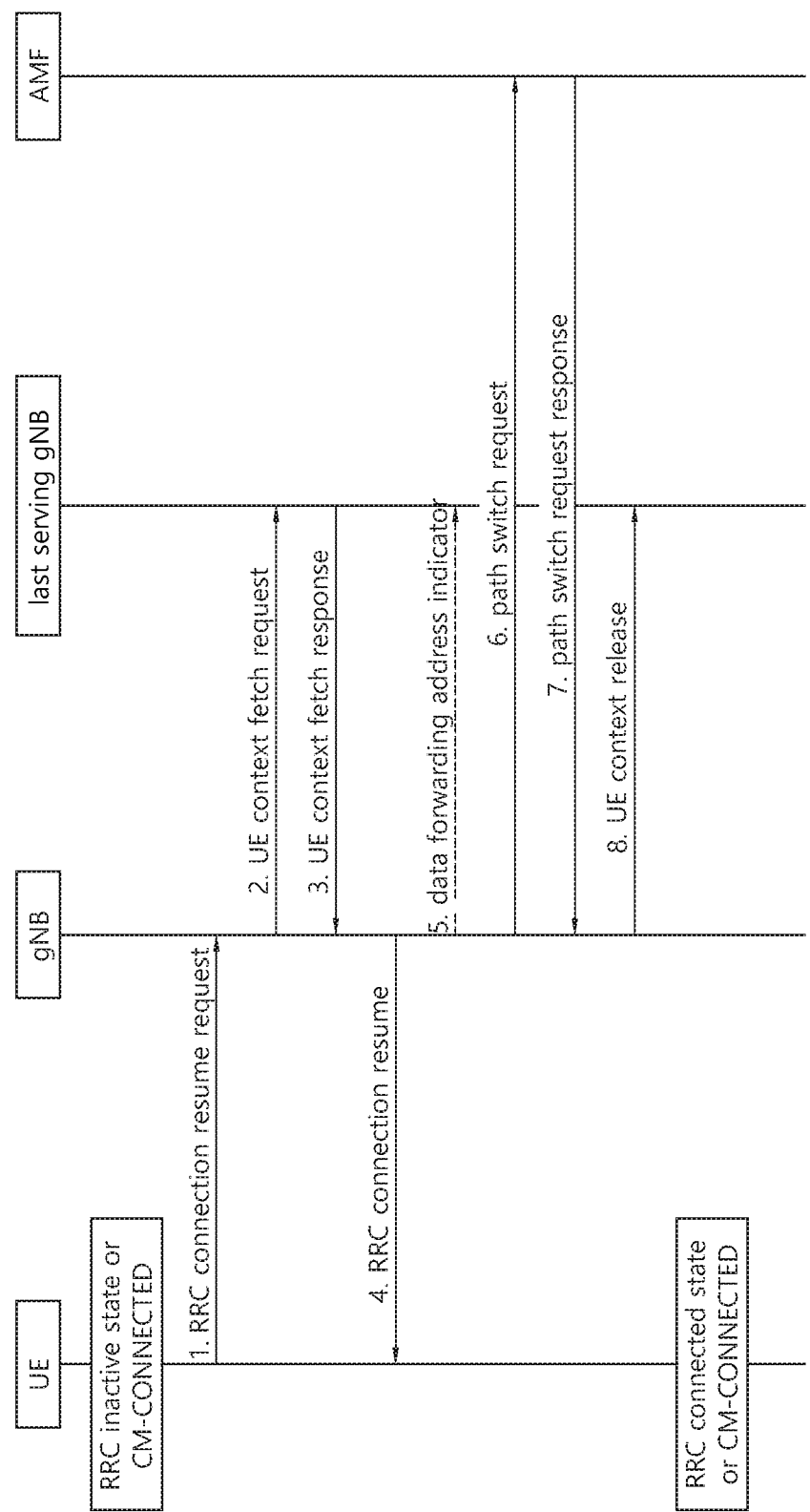
FIG. 5 shows an operation in which a UE transitions from an RRC_INACTIVE state to an RRC_CONNECTED state.

FIG. 5 shows an operation in which a UE transitions from an RRC_INACTIVE state to an RRC_CONNECTED state.

1. A UE resumes a connection in the RRC_INACTIVE state in which an I-RNTI allocated by a last serving gNB is provided.
2. A gNB requests the last serving gNB to provide UE context data if a gNB identity included in the I-RNTI can be identified.
3. The last serving gNB provides the UE context data.
4. The gNB completes the resumption of the RRC connection.
5. The gNB provides a forwarding address if DL user data buffered in the last serving gNB is prevented from being lost.
6/7. The gNB performs path switching.
8. The gNB triggers a release of a UE resource in the last serving gNB.

After the step 1, when the gNB determines to reject a resumption request and maintain the UE in the RRC_INACTIVE state without any reconfiguration or when the gNB determines to set up a new RRC access, SRB0 (without security) may be used. When the gNB determines to reconfigure the UE (e.g., with a new DRX cycle or RNA) or when the gNB determines to push the UE to transition to an RRC_IDLE state, SRB1 (with at least integrity protection) shall be used.

Meanwhile, in an RRC_INACTIVE state of NR, a UE may generate minimum signaling and minimize power consumption to save resource cost in an RAN and a core network. To this end, there is ongoing discussion on a method of transmitting data without state transition from the RRC_INACTIVE state to an RRC_CONNECTED state. As part of this discussion, there is growing interest on early data transmission. When data to be transmitted is small in size, the early data transmission refers to an operation of transmitting the data before an RRC connection setup is complete. According to the early data transmission, data transmission is possible even if the UE is not in the RRC_CONNECTED state.

If a gNB where a UE resides has changed and uplink data is generated in the UE, a new scheme may be considered in which buffered uplink data is transmitted from a current serving gNB of the UE to the anchor gNB where the UE has resided. Specifically, in an RRC_INACTIVE state newly defined in NR, a wired connection between a base station and a core network (corresponding to both a control plane and a user plane) may be configured to be maintained. In this case, if the UE is in the RRC_INACTIVE state, there is a need to transfer uplink data from the current serving gNB to the anchor gNB without an additional UE context fetch (an operation of fetching a UE context). From a network perspective, it is possible to minimize latency which may occur when uplink data is transferred in an RN through a UE context management procedure according to an embodiment of the present invention.

If the UE enters the RRC_INACTIVE state, a connection between the gNB and the NGC may still be maintained. According to early data transmission, the UE in the RRC_INACTIVE state may transmit uplink data without changing the RRC state to the RRC_CONNECTED state. In this case, without a UE context fetch from the anchor gNB where the UE resides, a current serving gNB may need to forward uplink data to the anchor gNB. This is possible since data transmitted in the RRC_INACTIVE state is significantly small in size. Accordingly, latency of data transmission needs to be minimized in an RAN. If the UE enters the RRC_CONNECTED state to transmit uplink data with a great size, the anchor gNB may request for state transition of the UE through the current gNB. There is a need for a new procedure requiring a method for managing a UE context between the current serving gNB and the anchor gNB.

Hereinafter, a method of managing a UE context according to an embodiment of the present invention is described. In this description, a gNB refers to a base station in NR, and a next generation core (NGC) refers to a core network in NR. In addition, in this description, the base station may be an eNB or a gNB, and the core network may be an MME or a next-generation core CP function (AMF of NGC). However, these terms are distinct according to the aforementioned operation and function, and may occasionally vary.

According to a first embodiment of the present invention, an anchor base station may provide a neighboring base station with a tunnel endpoint identifier (TEID) for uplink forwarding. If the anchor base station determines that the UE has to enter the RRC_CONNECTED state to transmit data with a great size, a UE context may be fetched to a current serving base station by triggering a handover procedure.

Figure 6B:
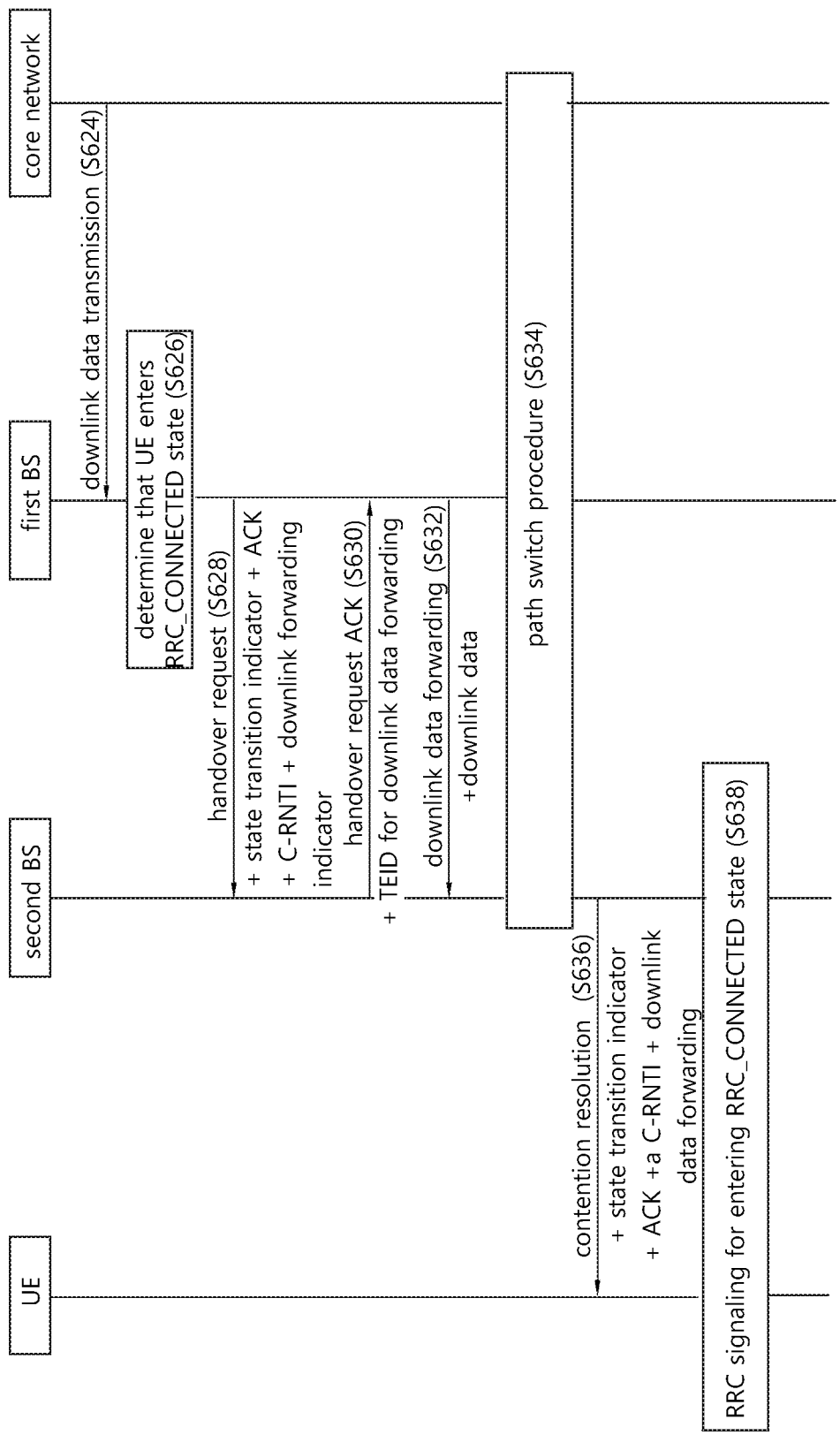

FIG. 6A and FIG. 6B are flowcharts for explaining a method of managing a UE context according to a first embodiment of the present invention.

Referring to FIG. 6A, in step S602, a UE may be in an RRC_CONNECTED state. An NG connection between a first base station and a core network may be maintained in a connected state. The first base station may be a base station of a coverage area where the UE is initially located.

In step S604, the first base station may determine that the UE will enter an RRC_INACTIVE state. For example, if there is no data transmission during a determined time, the first base station may determine that the RRC state of the UE will transition from the RRC_CONNECTED state to the RRC_INACTIVE state.

In step S606, upon determining that the UE will enter the RRC_INACTIVE state, the first base station may transmit to the UE an RRC connection release message instructing an RRC connection release. The RRC connection release message may include an indicator for informing the UE of the state transition to the RRC_INACTIVE state. An inactive UE ID allocated by the first base station may be included in the RRC connection release message, and the inactive UE ID may be used to identify a UE context in the first base station. In addition, RAN paging area information configured by the first base station may be included in the RRC connection release message. If the UE is located in the RAN paging area configured by the first base station, there is no need to additionally update a UE location to the first base station. A message instructing the UE to release the RRC connection is not necessarily the RRC connection release message, and may be transmitted as an additional new message.

In step S608, upon generation of uplink data in the UE, the first base station may transmit a data forwarding address indicator message to a second base station to instruct for uplink data forwarding to the first base station. Herein, the second base station may be a base station of a coverage area where the UE is currently located due to mobility, as any one of neighboring base stations located in an RAN paging area configured by the first base station. However, the data forwarding address indicator message may be provided not only to the coverage of the second base station where the current UE is located but also to all neighboring base stations located in the RAN paging area. The data forwarding address indicator message may include an inactive UE ID, a QoS profile, a PDU session ID, a TEID of the first base station for data forwarding, or the like. The TEID is used for the UE, and may be allocated by the first base station. A message used when the first base station instructs that uplink data will be forwarded to the first base station is not necessarily the data forwarding address indicator message, and may be configured as an additional new message.

Specifically, the first base station may transmit a TEID for the first base station to the second base station to instruct the second base station to forward uplink data to the first base station. Accordingly, upon receiving the uplink data from the UE, the second base station may forward uplink data to the first base station immediately by using the TEID. Therefore, upon receiving the uplink data, the second base station does not have to perform an additional procedure for requesting and receiving a corresponding UE context with respect to the first base station which stores the UE context. The TEID is information used when the second base station forwards uplink data to the first base station, and may be provided by the first base station to neighboring base stations existing in the same RAN paging area as the first base station. Since the TEID can be generated with smaller capacity than the UE context, radio resources are not excessively consumed when the first base station transfers the TEID to the neighboring base stations existing in the same RAN paging area.

In step S610, since the message which instructs for the entering to the RRC_INACTIVE state is received from the first base station, the UE may enter the RRC_INACTIVE state.

In step S612, the UE may be located in coverage of the second base station. The UE in the RRC_INACTIVE state may be located closer to the second base station than the first base station due to mobility, and the UE may access the second base station instead of the first base station. The second base station may belong to the same RAN paging area as the first base station.

In step S614, upon generation of uplink data to be transmitted to the base station, the UE may determine to transmit the uplink data without state transition to the RRC_CONNECTED state.

In step S616, the UE may transmit the uplink data to the second base station. The UE may transmit an inactive UE ID and a short MAC-I to the second base station together with the uplink data. The inactive UE ID may be used by the second base station to find a UE context. The inactive UE ID received from the UE is allocated by the first base station, and may be associated with the UE context of the UE. In addition, the short MAC-I may be used to verify validity of the UE. In this step, the UE may use an additional procedure to transmit data in the RRC_INACTIVE state. For example, a simplified RACH procedure consisting of two or four main steps may be used as a method for transmitting data in the RRC_INACTIVE state.

In step S618, the second base station may determine whether there is a UE context corresponding to the inactive UE ID received from the UE. If the second base station fails to find the UE context, the second base station may identify the first base station which provides the inactive UE ID through an Xn interface. That is, the second base station may recognize the first base station which provides the same inactive UE ID as the inactive UE ID received from the UE. Thereafter, the second base station may forward the uplink data received from the UE, to the first base station on the basis of the identified TEID received from the base station. The second base station may forward the inactive UE ID and the short MAC-I to the first base station together with the uplink data.

In step S620, the first base station may verify validity of the UE by using the short MAC-I received from the second base station.

In step S622, the first base station may transmit the uplink data towards a core network if the validity of the UE is verified.

Hereinafter, subsequent to FIG. 6A, FIG. 6B will be described.

In step S624, if the core network has downlink data to be transmitted to the UE or needs to transmit an acknowledgement (ACK) message for the uplink data received from the first base station, the core network may transmit the downlink data to the first base station in response.

In step S626, after verifying the validity of the UE, the first base station may determine whether the UE requires state transition to an RRC_CONNECTED state. If it is expected that subsequent uplink data with a great size is transmitted from the UE or if there is a downlink for transmission to the UE, the first base station may determine that the UE will enter the RRC_CONNECTED state.

In step S628, if it is expected that subsequent uplink data with a great size is transmitted from the UE or if there is a downlink for transmission to the UE, the first base station may trigger a handover procedure for transferring a UE context to the second base station. The handover procedure is a procedure in which the second base station fetches the UE context of the UE from the first base station as the UE moves from the first base station to the second base station. The first base station may transmit a handover request message or an additional new message to the second base station. The message may include an ACK message or a C-RNTI. In addition, the message may include a state transition indicator for triggering that the UE enters the RRC_CONNECTED state. In addition, the message may include a downlink forwarding indicator indicating that downlink forwarding will occur from the first base station to the second base station.

In step S630, since the message is received from the first base station, the second base station may transmit a handover request ACK message to the first base station to inform that a handover request is received normally. The handover request ACK message may include a TEID of the second base station used to perform forwarding to the second base station. However, the message for informing that the handover request is received normally may be configured not only as the handover request ACK message but also as an additional new message.

In step S632, if the TEID of the second base station for downlink forwarding is included in the handover request ACK message, the first base station may forward downlink data to the second base station.

In step S634, the second base station may initiate a path switch procedure to inform a network side that a UE location changes to the second base station.

In step S636, upon receiving uplink data from the UE (step S616), the second base station may respond to the UE by using a contention resolution procedure including the step of transmitting an ACK message, C-RNTI, and timing advance (TA) for the uplink data. The contention resolution procedure may include a step in which a state transition indicator is transferred to the UE to instruct state transition to a RRC_CONNECTED state.

In step S638, if the UE needs to transition from the RRC_INACTIVE state to the RRC_CONNECTED state, the UE may initiate RRC signaling to transition an actual state to the RRC_CONNECTED state.

According to a first embodiment of the present invention, if the second base station receives uplink data, latency may be decreased since, upon receiving the uplink data, the second base station does not have to perform an additional procedure for requesting and receiving a corresponding UE context with respect to the first base station which stores the UE context. In addition, the first base station may control an actual RRC state of the UE on the basis of a size of uplink data or downlink data. In addition, a handover procedure may be triggered to the second base station in order for the UE to transmit subsequent data in the RRC_INACTIVE state.

According to a second embodiment of the present invention, for uplink data forwarding, an anchor base station may instruct a neighboring base station of a TEID related to the anchor base station. To transfer downlink data from the anchor base station to the UE, the neighboring base station transmits a TEID related to the neighboring base station for downlink data forwarding. Upon recognizing that the UE returns to the RRC_CONNECTED state to transmit data with a grant size, the anchor base station may instruct the UE that a context fetch procedure has to be triggered in the neighboring base station after RRC signaling.

Figure 7B:
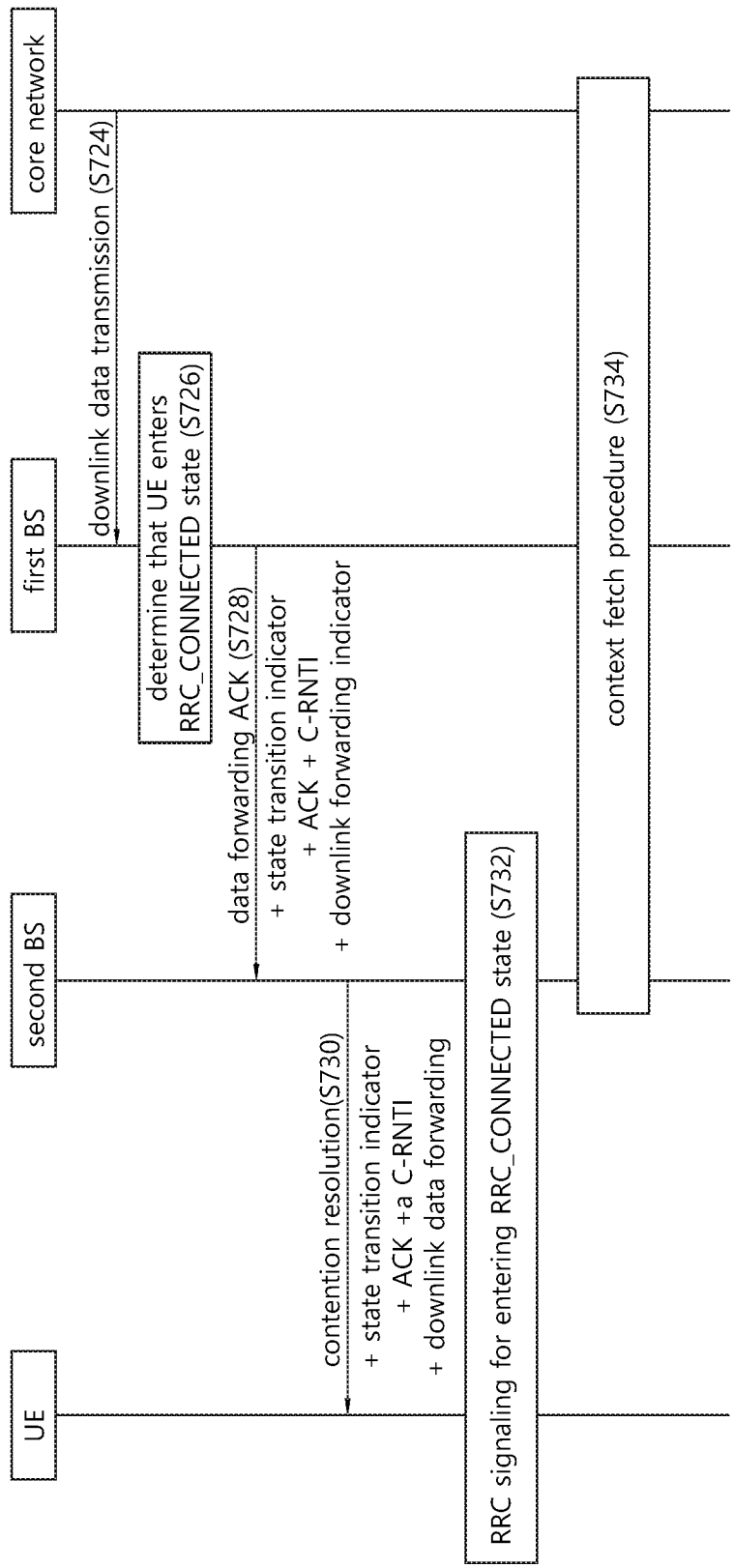

FIG. 7A and FIG. 7B are flowcharts for explaining a method of managing a UE context according to a second embodiment of the present invention.

Referring to FIG. 7A, in step S702, a UE may be in an RRC_CONNECTED state. An NG connection between a first base station and a core network may be maintained in a connected state. The first base station may be a base station of a coverage area where the UE is initially located.

In step S704, the first base station may determine that the UE will enter an RRC_INACTIVE state. For example, if there is no data transmission during a determined time, the first base station may determine that the RRC state of the UE will transition from the RRC_CONNECTED state to the RRC_INACTIVE state.

In step S706, upon determining that the UE will enter the RRC_INACTIVE state, the first base station may transmit to the UE an RRC connection release message instructing an RRC connection release. The RRC connection release message may include an indicator for informing the UE of the state transition to the RRC_INACTIVE state. An inactive UE ID allocated by the first base station may be included in the RRC connection release message, and the inactive UE ID may be used to identify a UE context in the first base station. The inactive UE ID received from the UE is allocated by the first base station, and may be associated with the UE context of the UE. In addition, RAN paging area information configured by the first base station may be included in the RRC connection release message. If the UE is located in the RAN paging area configured by the first base station, there is no need to additionally update a UE location to the first base station. A message instructing the UE to release the RRC connection is not necessarily the RRC connection release message, and may be transmitted as an additional new message.

In step S708, upon generation of uplink data in the UE, the first base station may transmit a data forwarding address indicator message to a second base station to instruct for uplink data forwarding to the first base station. Herein, the second base station may be a base station of a coverage area where the UE is currently located due to mobility, as any one of neighboring base stations located in an RAN paging area configured by the first base station. However, the data forwarding address indicator message may be provided not only to the coverage of the second base station where the current UE is located but also to all neighboring base stations located in the RAN paging area. The data forwarding address indicator message may include an inactive UE ID, a QoS profile, a PDU session ID, a TEID of the first base station for data forwarding, or the like. The TEID is used for the UE, and may be allocated by the first base station. A message used when the first base station instructs that uplink data will be forwarded to the first base station is not necessarily the data forwarding address indicator message, and may be configured as an additional new message.

In step S710, since the message which instructs for the entering to the RRC_INACTIVE state is received from the first base station, the UE may enter the RRC_INACTIVE state.

In step S712, the UE may be located in coverage of the second base station. The UE in the RRC_INACTIVE state may be located closer to the second base station than the first base station due to mobility, and the UE may access the second base station instead of the first base station. The second base station may belong to the same RAN paging area as the first base station.

In step S714, upon generation of uplink data to be transmitted to the base station, the UE may determine to transmit the uplink data without state transition to the RRC_CONNECTED state.

In step S716, the UE may transmit the uplink data to the second base station. The UE may transmit an inactive UE ID and a short MAC-I to the second base station together with the uplink data. The inactive UE ID may be used by the second base station to find a UE context. In addition, the short MAC-I may be used to verify validity of the UE. In this step, the UE may use an additional procedure to transmit data in the RRC_INACTIVE state. For example, a simplified RACH procedure consisting of two or four main steps may be used as a method for transmitting data in the RRC_INACTIVE state.

In step S718, the second base station may determine whether there is a UE context corresponding to the inactive UE ID received from the UE. If the second base station fails to find the UE context, the second base station may identify the first base station which provides the inactive UE ID through an Xn interface. That is, the second base station may recognize the first base station which provides the same inactive UE ID as the inactive UE ID received from the UE. Thereafter, the second base station may forward the uplink data received from the UE, to the first base station on the basis of the identified TEID received from the base station. The second base station may forward the inactive UE ID and the short MAC-I to the first base station together with the uplink data. In addition, the second base station may transmit to the first base station the TEID related to the second base station for forwarding of downlink data which is possibly generated, together with the uplink data.

In step S720, the first base station may verify validity of the UE by using the short MAC-I received from the second base station.

In step S722, the first base station may transmit the uplink data towards a core network if the validity of the UE is verified.

Hereinafter, subsequent to FIG. 7A, FIG. 7B will be described.

In step S724, if the core network has downlink data to be transmitted to the UE or needs to transmit an acknowledgement (ACK) message for the uplink data received from the first base station, the core network may transmit the downlink data to the first base station in response.

In step S726, after verifying the validity of the UE, the first base station may determine whether the UE requires state transition to an RRC_CONNECTED state. If it is expected that subsequent uplink data with a great size is transmitted from the UE or if there is downlink data to be transmitted to the UE, the first base station may determine that the UE will enter the RRC_CONNECTED state.

In step S728, the first base station may transmit a data forwarding ACK message or an additional new message to the second base station to inform that a data forwarding request is received normally. The message may include an ACK message or a C-RNTI. In addition, the message may include downlink data transferred to the UE through the second base station. That is, according to a second embodiment of the present invention, downlink data may be forwarded to the second base station by being included in the data forwarding ACK message.

In step S730, upon receiving uplink data from the UE (step S716), the second base station may respond to the UE by using a contention resolution procedure including the step of transmitting an ACK message, C-RNTI, and timing advance (TA) for the uplink data. The contention resolution procedure may include a step in which a state transition indicator is transferred to the UE to instruct state transition to a RRC_CONNECTED state.

In step S732, if the UE needs to transition from the RRC_INACTIVE state to the RRC_CONNECTED state, the UE may initiate RRC signaling to transition an actual state to the RRC_CONNECTED state.

In step S734, the second base station may trigger a context fetch procedure to fetch a UE context from the first base station through an Xn interface.

According to a second embodiment of the present invention, the second base station may transfer uplink data without fetching a UE context from the first base station, thereby decreasing a waiting time. In addition, the first base station may transfer downlink data to the UE through the second base station without fetching the UE context. The first base station may also control an actual RRC state of the UE on the basis of an amount of downlink and uplink data.

Figure 8:
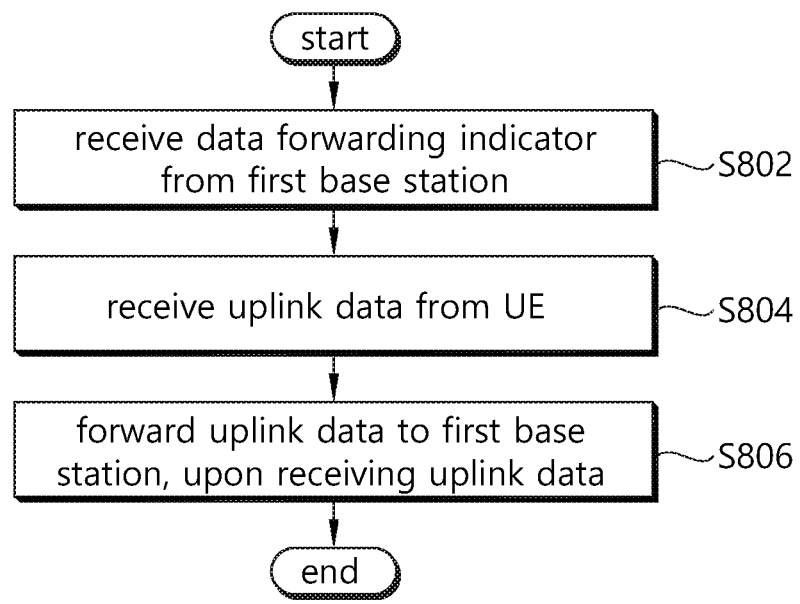
FIG. 8 is a flowchart for explaining a method of managing a UE context according to an embodiment of the present invention.

FIG. 8 is a flowchart for explaining a method of managing a UE context according to an embodiment of the present invention.

In step S802, when uplink data is generated from a first base station, a second base station may receive a data forwarding indicator indicating for forwarding of the uplink data. The data forwarding indicator may include at least one of a quality-of-service (QoS) profile, a protocol data unit (PDU) session identification (ID), a UE ID of a UE, and a tunnel endpoint identifier (TEID) for the first base station.

In step S804, the second base station may receive uplink data from the UE in the RRC_INACTIVE state.

In step S806, the second base station may forward the uplink data to the first base station according to the data forwarding indicator. A step in which the second base station identify the first base station by using the UE ID corresponding to the UE may be further included upon receiving the uplink data from the UE. In the forwarding step, the uplink data may be forwarded to the first base station by using the TEID. The uplink data may include the UE ID of the UE and a short-MAC-I. A step in which the first base station verifies validity of the UE on the basis of the short MAC-I may be further included. After performing the step of receiving the data forwarding indicator, a step in which the UE moves from coverage of the first base station to coverage of the first base station may be further included. The step of forwarding the uplink data to the first base station may include a step of transmitting a TEID for the second base station to the first base station. Thereafter, upon generation of downlink data as the uplink data is transmitted to the core network, the first base station may forward the downlink data to the second base station by using the TEID for the second base station.

In addition, the first base station may transmit, to a core network, uplink data forwarded from the second base station, and may determine whether the UE needs to enter an RRC_CONNECTED state as the first base station transmits the uplink data. In the step of determining whether the UE needs to enter the RRC_CONNECTED state, the first base station may determine whether subsequent uplink data greater than or equal to a determined size is transmitted from the UE. In the step of determining whether the UE needs to enter the RRC_CONNECTED state, the first base station may determine whether there is a need to transmit an acknowledgement (ACK) for the uplink data. Upon determining that the UE needs to enter the RRC_CONNECTED state, the first base station transmits, to the second base station, a handover request message for requesting the UE to handover to the second base station. Upon receiving the handover request message by the second base station, the second base station may request the first base station to transmit the UE context of the UE. The handover request message may include a state transition message for instructing the UE to enter RRC_CONNECTED state. The handover request message may include an ACK message for uplink data received from the UE, a cell radio network temporary identifier (C-RNTI) of the first base station, and a downlink forwarding indicator indicating a presence of downlink data to be transmitted to the UE.

Figure 9:
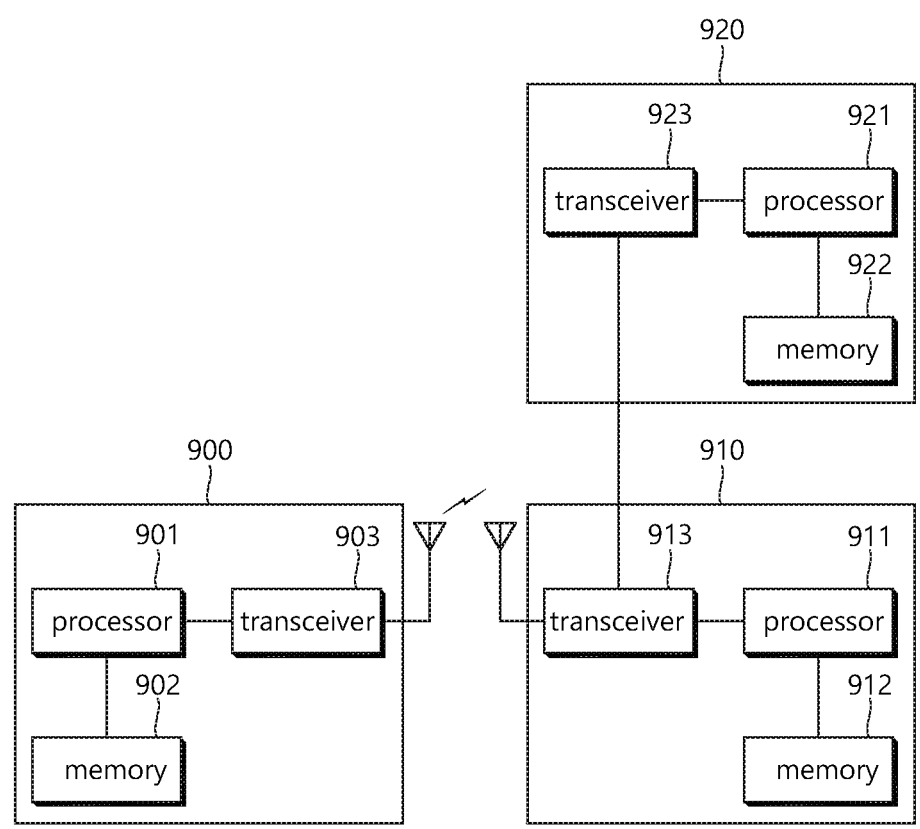
FIG. 9 is a block diagram illustrating a wireless apparatus in which an embodiment of the present invention can be implemented.

FIG. 9 is a block diagram illustrating a wireless apparatus in which an embodiment of the present invention can be implemented.

A first network node 900 includes a processor 901, a memory 902, and a radio frequency (RF) unit 903. The memory 902 is coupled to the processor 901, and stores a variety of information for driving the processor 901. The RF unit 903 is coupled to the processor 901, and transmits and/or receives a radio signal. The processor 901 implements the proposed functions, procedures, and/or methods. In the aforementioned embodiments, an operation of the BS may be implemented by the processor 901. In this embodiment, the first network node 900 may be the first BS in the aforementioned embodiments.

A second network node 910 includes a processor 911, a memory 912, and an RF unit 913. The memory 912 is coupled to the processor 911, and stores a variety of information for driving the processor 911. The RF unit 913 is coupled to the processor 911, and transmits and/or receives a radio signal. The processor 911 implements the proposed functions, procedures, and/or methods. The second network node 910 may be a second BS or upper layer entity, an operation of the second network node 910 or the upper layer entity in the aforementioned embodiments may be implemented by the processor 911.

The processors 911 may include application-specific integrated circuit (ASIC), other chipset, logic circuit and/or data processing device. The memories may include read-only memory (ROM), random access memory (RAM), flash memory, memory card, storage medium and/or other storage device. The RF units may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of managing, by a first base station, a user equipment (UE) context in a wireless communication system, the method comprising:

transmitting, to a second base station, a data forwarding indicator indicating the second base station is to forward to the first base station uplink data that is received by the second base station;

receiving the forwarded uplink data from the second base station based on the data forwarding indicator, wherein the uplink data received by the second base station is from the UE in a Radio Resource Control (RRC)_INACTIVE state with the second base station;

forwarding the uplink data received from the second base station to a core network;

determining whether the UE is to enter an RRC CONNECTED state based on one condition of a predetermined set of conditions, the predetermined set of conditions comprising:
the UE, having a predetermined amount of subsequent uplink data to send, and the first base station having downlink data to send to the UE:
based on determining that the UE is to enter the RRC_CONNECTED state, transmitting, to the second base station, a handover request message which includes an acknowledgement (ACK) for the uplink data and state transition information,
wherein the state transition information is for instructing the UE to enter the RRC_CONNECTED state, and
wherein the data forwarding indicator includes at least one of a quality-of-service (QoS) profile, a protocol data unit (PDU) session ID, or a tunnel endpoint identifier (TEID) of the first base station.

2. The method of claim 1,
wherein the first base station is identified by the second base station based on the TED of the first base station, and
wherein the uplink data is forwarded by the second base station based on the TED of the first base station.

3. The method of claim 1, wherein the UE moves from a coverage of the first base station to a coverage of the second base station, after the second base station receives of the data forwarding indicator.

4. The method of claim 1, further comprising:
verifying a validity of the UE based on a short-Medium Access Control (MAC)-I,
wherein the uplink data includes an ID of the UE and the short-MAC-I.

5. The method of claim 1, wherein the predetermined amount of subsequent uplink data is greater than or equal to a specific size.

6. The method of claim 1, further comprising:
receiving, from the second base station, a request to transmit the UE context of the UE, based on the handover request message.

7. The method of claim 1, wherein the handover request message further includes a cell radio network temporary identifier (C-RNTI) of the first base station, and a downlink forwarding indicator informing the second base station of a presence of downlink data to be sent to the UE.

8. The method of claim 1, further comprising:
receiving from the second base station the TED of the second base station upon the receiving the uplink data forwarded from the second base station.

9. The method of claim 8, further comprising:
forwarding downlink data to the second base station by using the TED of the second base station.

10. A first base station for managing a user equipment (UE) context in a wireless communication system, the first base station comprising:
a memory;
a transceiver; and
a processor coupling the memory and the transceiver, Wherein the processor is configured to:
transmit, to a second base station, a data forwarding indicator indicating the second base station is to forward to the first base station uplink data that is received b the second base station;
receive the forwarded uplink data from the second base station based on the data forwarding indicator, wherein the uplink data received by the second base station is from the UE in a Radio Resource Control (RRC)_INACTIVE state with the second base station;
forward the uplink data received from the second base station to a core network;
determine whether the UE is to enter an RRC CONNECTED state based on one condition of a predetermined set of conditions,
the predetermined set of conditions comprising:
the UE having a predetermined amount of subsequent uplink data to send, and the first base station having downlink data to send to the UE;
based on determining that the UE is to enter the RRC_CONNECTED state, transmit, to the second base station, a handover request message which includes an acknowledgement (ACK) and state transition information,
wherein the state transition information is for instructing the UE to enter the RRC_CONNECTED state, and
wherein the data forwarding indicator includes at least one of a quality-of-service (QoS) profile, a protocol data unit (PDU) session ID, or a tunnel endpoint identifier (TEID) of the first base station.

11. The method of claim 1, wherein the data forwarding indicator includes each of the QoS profile, the PDU session ID, and the TED of the first base station.

12. The first base station of claim 10, wherein the data forwarding indicator includes each of the QoS profile, the PDU session ID, and the TEID of the first base station.

* * * * *